United States Patent
Lee (10) Patent No.: US 7,154,847 B2
(45) Date of Patent: Dec. 26, 2006

(54) FAST FOURIER TRANSFORMING APPARATUS AND METHOD THEREOF FOR COMPENSATING FOR OFDM OUTPUT BIT SIGNAL

(75) Inventor: Jeong-Sang Lee, Seoul (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 1167 days.

(21) Appl. No.: 09/972,959

(22) Filed: Oct. 10, 2001

(65) Prior Publication Data
US 2002/0080717 A1 Jun. 27, 2002

(30) Foreign Application Priority Data
Nov. 10, 2000 (KR) .............................. 2000-66861

(51) Int. Cl.
*H04J 11/00* (2006.01)
(52) U.S. Cl. .......................................... 370/210
(58) Field of Classification Search .................... None
See application file for complete search history.

(56) References Cited

U.S. PATENT DOCUMENTS 6,058,409 A * 5/2000 Kozaki et al. ............... 708/409
6,240,062 B1 * 5/2001 Kozaki et al. ............... 370/210
6,735,167 B1 * 5/2004 Nawa et al. ................. 370/208
2003/0142764 A1 * 7/2003 Keevill et al. ............... 375/354

* cited by examiner

*Primary Examiner*—Chi Pham
*Assistant Examiner*—Anh-Vu Ly
(74) *Attorney, Agent, or Firm*—Sughrue Mion, PLLC

(57) ABSTRACT

A Fast Fourier Transforming apparatus and method thereof for compensating for an OFDM output bit signal is described. The apparatus includes an input buffer unit for storing and outputting a received OFDM bit signal and a butterfly operation unit for performing a butterfly operation according to a radix algorithm. The apparatus comprises a scale detection unit for calculating and outputting a scale factor which is a division factor used for controlling a bit value of a butterfly operated signal input from the butterfly operation unit at each of the stages to a predetermined bit limit of the received OFDM signal, a scale count unit for cumulative counting a count figures corresponding to the scale factor input from the scale detection unit and outputting the result, and a compensation unit for controlling the bit of a signal input from the butterfly operation unit according to result values from the scale detection unit and the scale count unit and outputting the result.

24 Claims, 7 Drawing Sheets

FAST FOURIER TRANSFORMING APPARATUS AND METHOD THEREOF FOR COMPENSATING FOR OFDM OUTPUT BIT SIGNAL

BACKGROUND OF THE INVENTION

1. Field of the Invention

The present invention relates to a Fast Fourier Transforming apparatus and method thereof for restoring a received OFDM-modulated signal to an original signal, and more particularly, to a Fast Fourier Transforming apparatus and method thereof for compensating for OFDM output bit signal, thereby outputting an amount of data which is the same as the amount of input data.

2. Description of the Related Art

An OFDM (Orthogonal Frequency Division Multiplexing) is adopted for modulation method, by which data inputted serially along the time axis is transformed to parallel data, transformed back to the serial data by IFFT (Inverse Fast Fourier Transform) and then transferred to a receiving end.

At the receiving end of the OFDM modulation signal, input data is converted to a digital signal. Such converted signal is restored to the original signal by a FFT (Fast Fourier Transform) at the predetermined unit length.

Here, in a FFT apparatus (not shown) that performs FFT, a butterfly operation unit is inserted for performing a butterfly operation according to a radix algorithm.

The butterfly operation can perform forward and inverse butterfly operations according to the radix algorithm. That is, a cross operation of a positive and a negative operation is performed. The input signal undergoes the butterfly operation repeatedly according to the predetermined number of stages n that are required for performing the butterfly operation on the input signal by the following arithmetic expression:

$$n = \log \frac{N}{2} \quad (1)$$

N is the number of points that are required for performing the butterfly operation on the input bit signal.

Since an input signal to the butterfly operation unit is amplified to an extent of $\sqrt{2}$ times at each stage, a signal calculated and outputted from the butterfly operation unit becomes greater than the input signal. To restore the original amplitude of the input signal, a bit signal having the same bit value as that of a signal input to the butterfly operation unit has to be generated by the FFT apparatus.

Figure 1A:
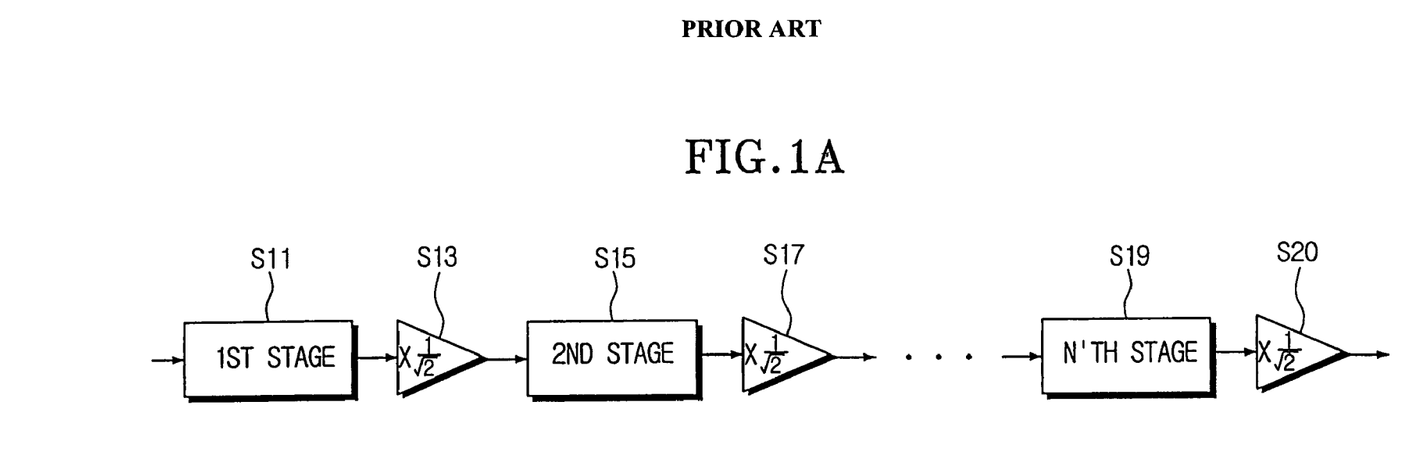
FIGS. 1A and 1B are flowcharts for showing the conventional method for compensating for an output bit signal.
Figure 1B:
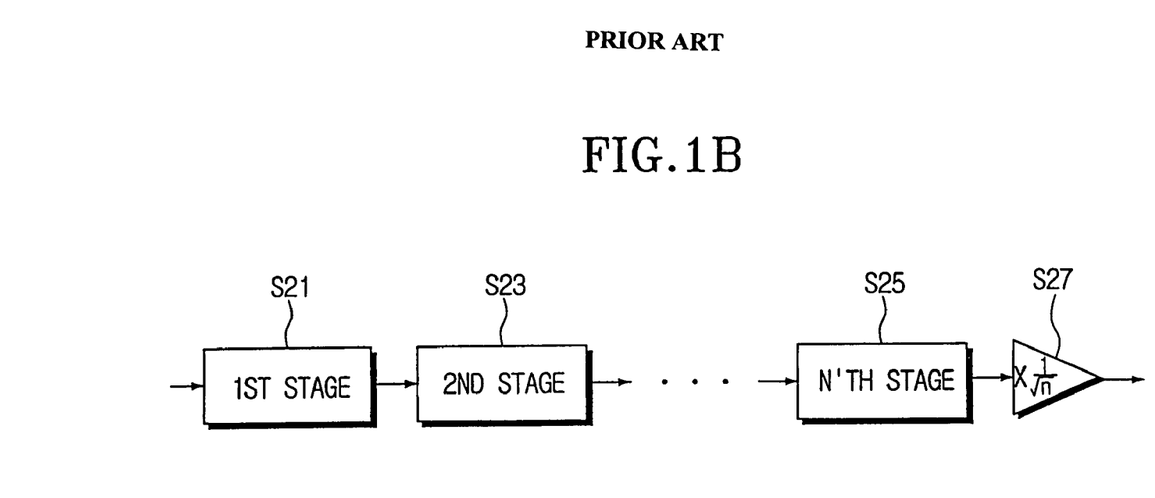

FIGS. 1A to 1B are flowcharts for showing the steps of compensating for OFDM output bit signal by the conventional method.

FIG. 1A shows a value, which is calculated by the butterfly operation, and divided by $\sqrt{2}$ at the end of each stage, in order to compensate for the amplification of the output signal (Steps S11 through S20). According to this method, since dividing by $\sqrt{2}$ is performed at the end of every stage, the calculated amount is increased as the number of the stages is increased. Further, since the fixed operation is performed without considering errors in the input signal, a problem arises in that more error occurs as the number of stages increases.

As shown in FIG. 1B, after the butterfly operation is performed on the input signal as many times as the predetermined number of stages n, the signal is divided by $\sqrt{n}$ to compensate for the amplification that occurred (Steps S21 through S27).However, the fixed operation is performed without considering some errors contained in the input signal, and accordingly, the error increases as the number of stages increases.

SUMMARY OF THE INVENTION

The present invention has been made to overcome the above-mentioned problems of the related art, and accordingly, it is an object of the present invention to provide a Fast Fourier Transform apparatus and a method thereof for compensating an OFDM output bit signal, capable of controlling a Fourier-transforming of a bit value input to an input end of a FFT apparatus within a predetermined range.

The above object is accomplished by a FFT apparatus for compensating an OFDM output bit signal according to the present invention, including an input buffer unit for storing an OFDM bit signal, a butterfly operation unit for performing a butterfly operation at each of the stages according to a radix algorithm, a scale detection unit for calculating and outputting a scale factor which is a division factor used for controlling a bit value of a butterfly operated signal input from the butterfly operation unit at each of the stages to a predetermined bit limit of the received OFDM signal, a scale count unit for cumulative counting a count figure corresponding to the scale factor input from the scale detection unit and outputting the result, and a compensation unit for controlling the bit of a signal input from the butterfly operation unit according to result values from the scale detection unit and the scale count unit and outputting the result.

The compensating unit includes a second operation unit for dividing the bit value of the butterfly operated output signal at the final stage of the predetermined stages by the scale factor calculated at the final stage, a division and multiplication selection unit for calculating a difference value of the predetermined number of stages and an output value from the scale count unit, comparing the predetermined number of stages with the output value from the scale count unit and outputting a selection signal for division operation if the predetermined number of stages is greater or a selection signal for multiplication if the output value from the scale count unit is greater, a coefficient calculation unit for calculating and outputting a quotient Q and a remainder R by dividing the difference value by 2, a division and multiplication calculation unit for dividing the value output from the second operation unit by $2^Q$ if the selection signal is for the division operation or multiplying the value output from the second operation unit by $2^Q$ if the selection signal is for the multiplication operation, a bit compensation unit for compensating the value output from the division and multiplication calculation unit according to the selection signal from the division and multiplication selection unit and the remainder R from the coefficient calculation unit, and an adder unit for adding the data input from the bit compensation unit and outputting the result.

To achieve the objective of the invention, there is provided a Fast Fourier Transforming method for compensating an OFDM output bit signal, including a step of input buffering for storing and outputting a received OFDM bit signal, a step of first operation for dividing the received signal by a scale factor and outputting the result, a step of butterfly operation for butterfly operating on the result at each of the stages according to a radix algorithm and outputting the butterfly operated signal, a step of scale detection for calculating the scale factor which is a division factor that is used for controlling the bit value of the butterfly operated signal to fall within the predetermined bit limit of the OFDM signal input at the step of the input buffering, a step of scale count for cumulative counting a count figure corresponding to input bit scale factor and outputting the cumulative scale count value, wherein the step of input buffering through the step of a scale count are repeatedly conducted until the scale count value reaches a predetermined number of stages, and a step of compensation for controlling the butterfly operated value which is calculated at the final stage of the predetermined stages according to the scale factor and the scale count value.

BRIEF DESCRIPTION OF THE DRAWINGS

The above objective and advantage of the present invention will become more apparent by describing in detail a preferred embodiment thereof with reference to the attached drawings in which.

DETAILED DESCRIPTION OF THE PRESENT INVENTION

Hereinafter, embodiments of the present invention will be described in detail with reference to the attached drawings. However, the embodiments of the present invention can be modified into various other forms, and the scope of the present invention must not be interpreted as being restricted to the embodiments. The embodiments are provided to more completely explain the present invention to those skilled in the art., like reference numerals in the drawings denote the same members.

Figure 2:
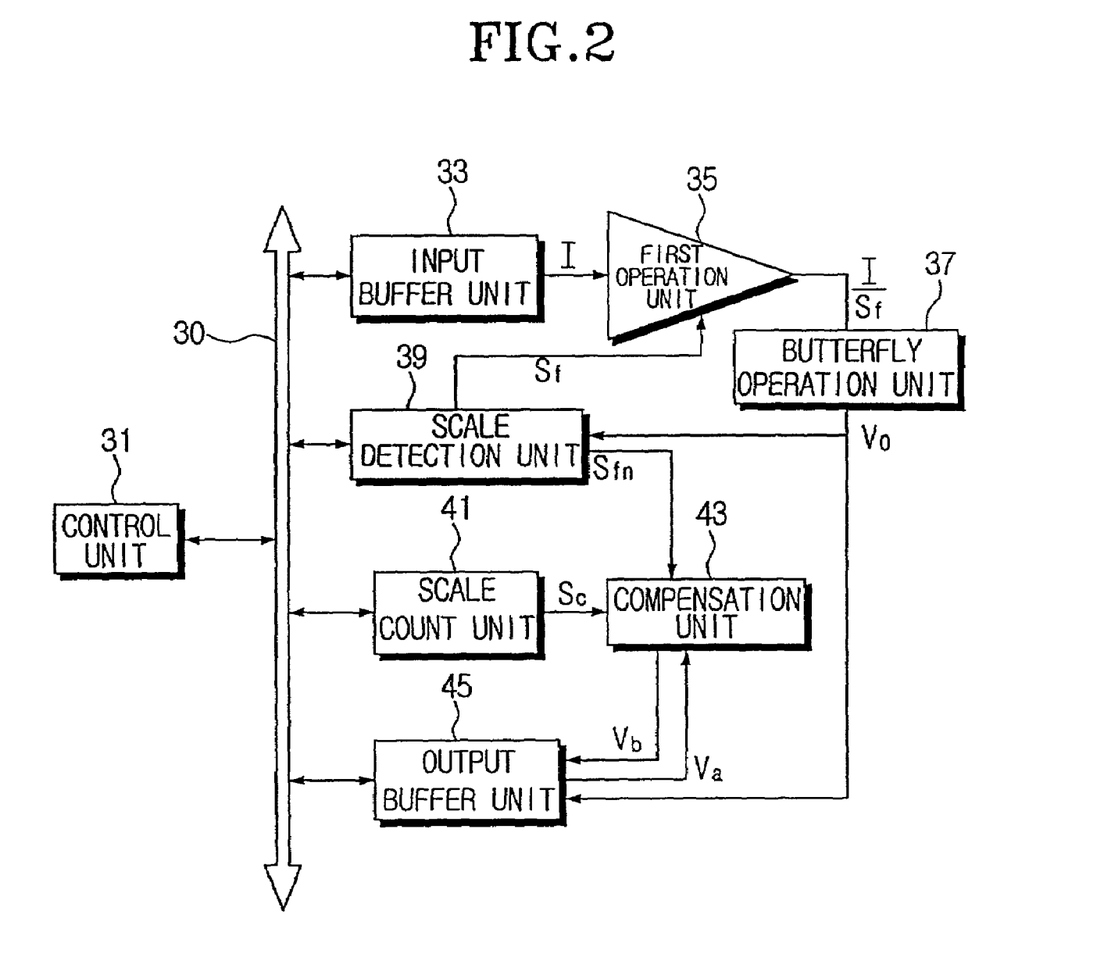
FIG. 2 is a block diagram illustrating a Fast Fourier transforming apparatus for compensating an OFDM output bit signal according to the present invention.

Referring to FIG. 2, the FFT apparatus for compensating for OFDM output bit signal according to the present invention includes a scale detection unit 39, a scale count unit 41 and a compensation unit 43.

The FFT apparatus according to the present invention preferably has a bus 30 as a data pathway, an input buffer unit 33 located at the input end for storing the input signal and a butterfly operation unit 37 for performing a butterfly operation.

The scale detection unit 39 calculates and outputs a scale factor for controlling the bit value of the input signal from the butterfly operation unit 37 within the predetermined bit limit of the OFDM signal input to the input buffer unit 33.

The scale count unit 41 cumulatively counts a count figure corresponding to the scale factor that is input from the scale detection unit 39, and then outputs the result.

The compensation unit 43 controls the bit value of the signal that is input from the butterfly operation unit 37 according to both of the values from the scale detection unit 39 and scale count unit 41, and then outputs the result.

It is preferable to insert a first operation unit 35 in between the input buffer unit 33 and the butterfly operation unit 37. The first operation unit 35 divides the bit value of the later input signal by the scale factor of the first input signal, thereby performing the butterfly operation in a manner of considering the scale factor from the scale detection unit 39. It is also preferable to insert an output buffer unit 45 to the output end to store the output signal from the butterfly operation unit 37 at each stage. Also, the control unit 31, which controls signal flow, can be connected to feed the signal stored in the output buffer unit 45 back to the input buffer unit 33 until the number of butterfly operations reach the predetermined number of stages n. The signal calculated at the final stage of the predetermined number of stages n through the butterfly operation, is outputted to the compensation unit 43.

The preferred embodiment of the FFT apparatus for compensating an OFDM output bit signal will be described below in detail.

According to the preferred embodiment of the present invention, the butterfly operation is performed utilizing a radix-2 algorithm. A signal is inputted to the input buffer unit 33 by 8 bits (I=8 bits) under the control of the control unit 31. A bit limit of the scale detection unit 39 is set to 12 bits.

Figure 3:
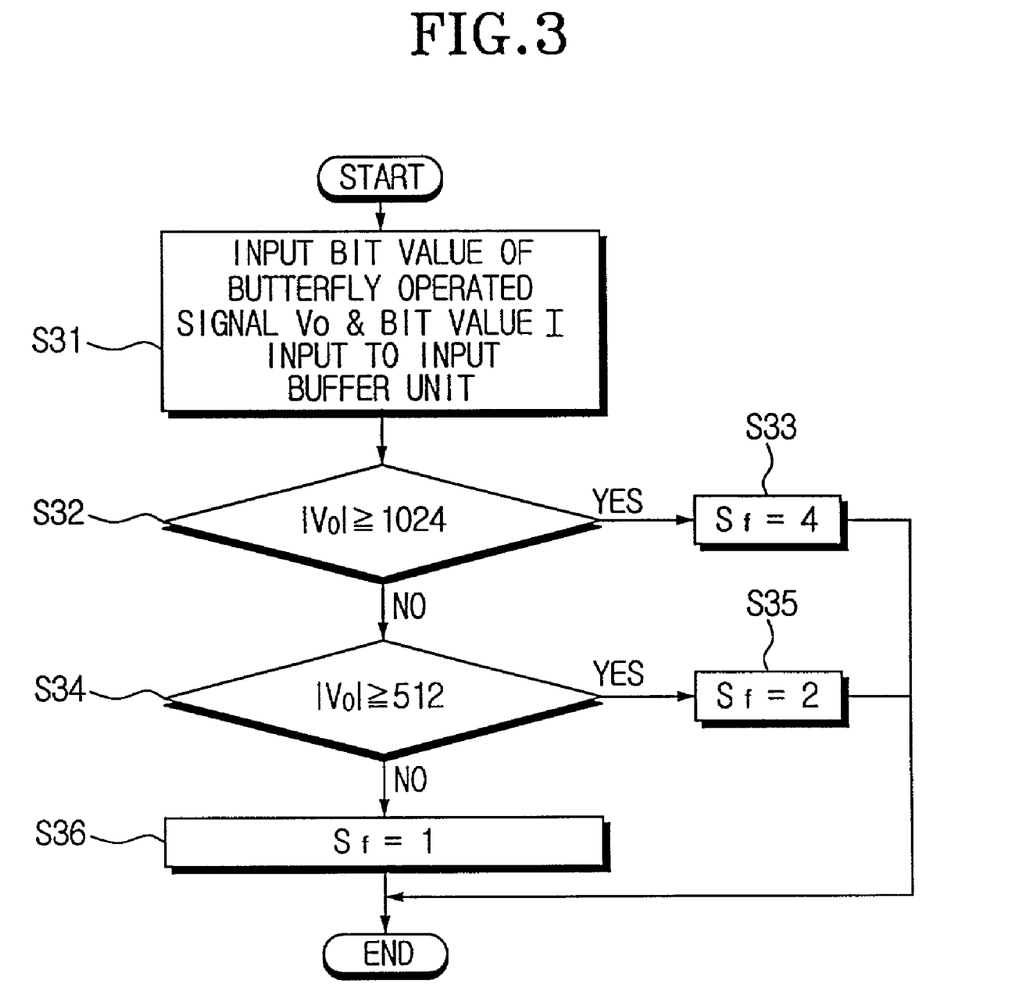
FIG. 3 is a flowchart for showing the steps of calculating a scale factor in the scale detection unit.

FIG. 3 is a flowchart showing the steps of calculating the scale factor Sf of the scale detection unit 39. First, the bit value Vo of the butterfly-operated signal outputted from the butterfly operation unit 37 and the bit value I of the signal input to the input buffer unit 33 are received (step S31). Next, it is determined whether the absolute value |Vo| of the bit value Vo is greater than 1024 (step S32). If the absolute value |Vo| of the bit value Vo is greater than 1024, the scale factor, which is a division factor used for controlling a signal value within the predetermined bit limit of the OFDM bit signal, is set to 4 (step S33). On the other hand, if the absolute value |Vo| of the bit value Vo of the butterfly-operated signal is less than 1024, then it is determined if the absolute value |Vo| is greater than 512 (step S34). If the absolute value |Vo| is greater than 512 in S34, then the scale factor Sf is set to 2 (step S35), while if the absolute value |Vo| is less than 512, then the scale factor is set to 1 (step S36). The scale factor Sf, that is set in this way, is outputted to the first operation unit 35 and the scale factor Sfn of the final stage is outputted by the control unit 31 to the first operation unit 35 and to the compensation unit 43, respectively.

Figure 4:
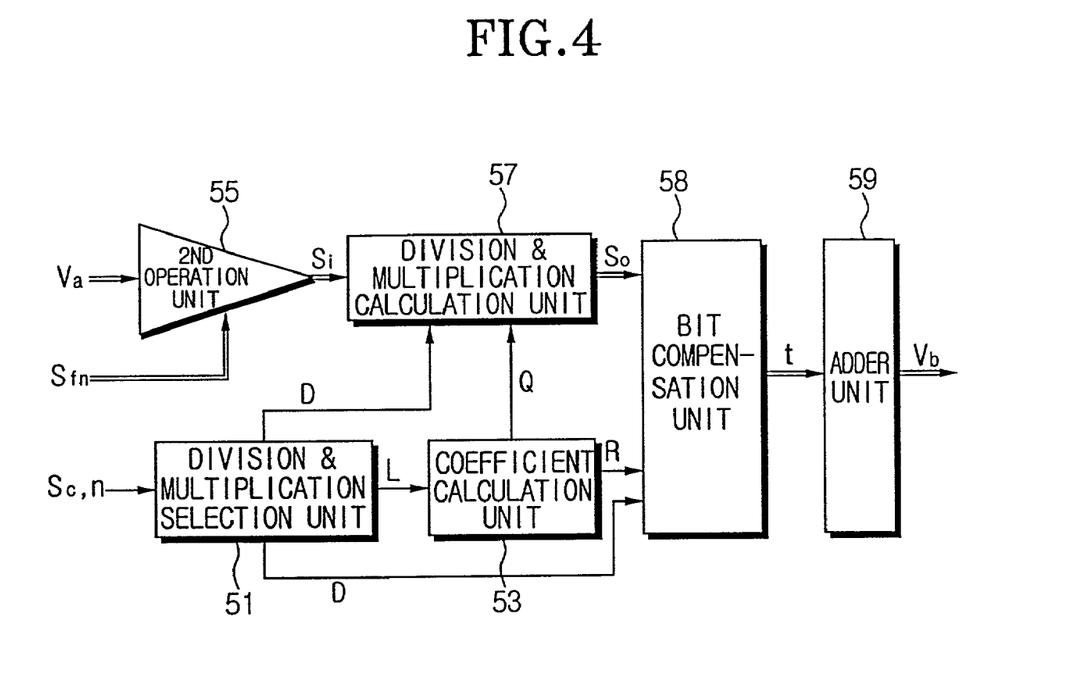
FIG. 4 is a detailed block diagram illustrating a compensation unit of FIG. 2.

FIG. 4 is a detailed block diagram showing the compensation unit 43 of FIG. 2 in detail.

As shown in FIG. 4, the compensation unit 43 includes a second operation unit 55, a division and multiplication selection unit 51, a coefficient calculation unit 53, a division and multiplication calculation unit 57, a bit compensation unit 58 and an adder unit 59.

The second operation unit 55 divides the value Va calculated by the butterfly operation at the final stage of the predetermined number of stages n by the final scale factor Sfn, and then outputs the result.

The division and multiplication selection unit 51 calculates a difference value L between the predetermined number of stages n and the scale count Sc, and determines the selection signal D whether it is for the division operation or the multiplication operation, and then outputs the difference value L and the selection signal D.

The coefficient calculation unit 53 calculates the coefficient R required for compensating the input bit signal from the difference value L.

The division and multiplication calculation unit 57 selectively performs the division operation and the multiplication operation on the value Si from the second operation unit 55 according to the selection signal D, and then yields a result value So.

The bit compensation unit 58 receives the coefficient R from the coefficient calculation unit 53, the selection signal D and the value So, and compensates for the value So according to the coefficient R and the selection signal D, resulting in the compensated value t.

The adder unit 59 adds the compensated value t (input from the bit compensation unit 58), and then outputs the result.

The second operation unit 55 divides the bit value Va of the butterfly operated signal at the final stage of the predetermined number of stages n by the scale factor Sfn calculated at the final stage, and then outputs the result value Si=Va/Sfn.

The division and multiplication selection unit 51 compares the predetermined number of stages n with the output value Sc from the scale count unit 41 to yield the difference value L, by the following arithmetic expression:

$$L=|Sc-n| \quad (2)$$

The division and multiplication selection unit 51 also yields and outputs a selection signal D for determining between the division operation and the multiplication operation. If the predetermined number of stages n is greater than Sc, then the selection signal is set for the division operation, while if the scale count Sc is greater than n, then the selection signal is set for the multiplication operation.

The coefficient calculation unit 53 calculates and outputs a quotient Q and remainder R by dividing the difference value L from the division and multiplication selection unit 51 by 2 as the following arithmetic expression:

$$L/2=2Q+R \quad (3)$$

The division and multiplication calculation unit 57 calculates and outputs the multiplication result So obtained by multiplying the value input from the second operation unit by $2^Q$ if the selection signal is for the multiplication operation, while the division and multiplication calculation unit 57 calculates and outputs the division result So obtained by dividing the value input from the second operation unit by $2^Q$ if the selection signal is for the division operation by the following arithmetic expressions:

$$So=Si \times 1/2^Q \text{ (if } D=D2) \quad (4)$$

$$So=Si \times 2^Q \text{ (if } D=D2) \quad (4)$$

The bit compensation unit 58 outputs the data So intact from the division and the multiplication unit 57 to the adder unit 59 if the remainder R of the expression 3 is not "1"

The bit compensation unit 58 calculates and outputs the multiplication results t1=t11, t12, t13, t14 to the adder unit 59 after multiplying the data So from the division and the multiplication calculation unit 57 by ½, ⅛, ¹⁄₁₆, ¹⁄₆₄, respectively, if the remainder R of the expression 3 is "1" and if the selection signal input is for the division operation D1, which can be expressed by the following arithmetic expressions:

$$t11=So \times 1/2$$

$$t12=So \times 1/8$$

$$t13=So \times 1/16$$

$$t14=So \times 1/64 \quad (5)$$

Alternately, the bit compensation unit 58 calculates and outputs the multiplication results t2=t21, t22, t23, t24 by multiplying the data So from the division and the multiplication calculation unit 57 by 1, ¼, ⅛, ¹⁄₃₂, respectively, if the remainder R of the expression 3 is "1" and if the selection signal input is for the multiplication operation D2, which can be expressed by the following arithmetic expressions:

$$t21=So$$

$$t22=So \times 1/4$$

$$t23=So \times 1/8$$

$$t24=So \times 1/32 \quad (6)$$

The adder unit 59 adds the data t1, t2 from the bit compensation unit 58 and outputs the cumulative results t10, t20 within the predetermined limit of the bit value input to the input buffer unit 33, which can be expressed by the following arithmetic expressions:

$$t10=t11+t12+t13+t14$$

$$t20=t21+t22+t23+t24 \quad (7)$$

Figure 5:
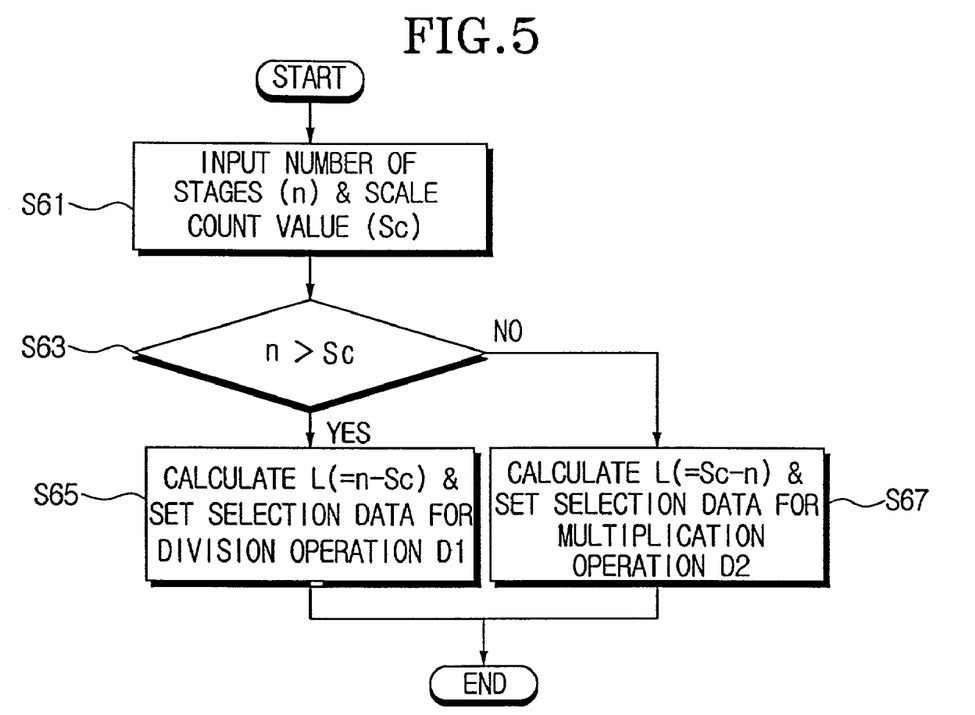
FIG. 5 is a flowchart for showing the steps of selecting a division or multiplication of the division and multiplication selection unit of FIG. 4.

FIG. 5 is a flowchart for showing the steps of the division and multiplication selection of the division and multiplication selection unit 51. First, the division and multiplication selection unit 51 receives the predetermined number of stages n and the scale count Sc (step S61). Next, the division and multiplication selection unit 51 compares the bit value of the predetermined number of stages n with the bit value of the scale count Sc (step S63). If the predetermined number of stages n is greater than the scale count Sc, then the bit value of the scale count Sc is subtracted from the bit value of the predetermined number of stages n, yielding a difference value L and setting the selection signal to the division operation (step S65). However, if the predetermined number of stages n is less than the scale count Sc, then the bit value of the predetermined number of stages n is subtracted from the bit value of the scale count Sc, yielding the difference value L and setting the selection signal to the multiplication operation (step S67).

Figure 6:
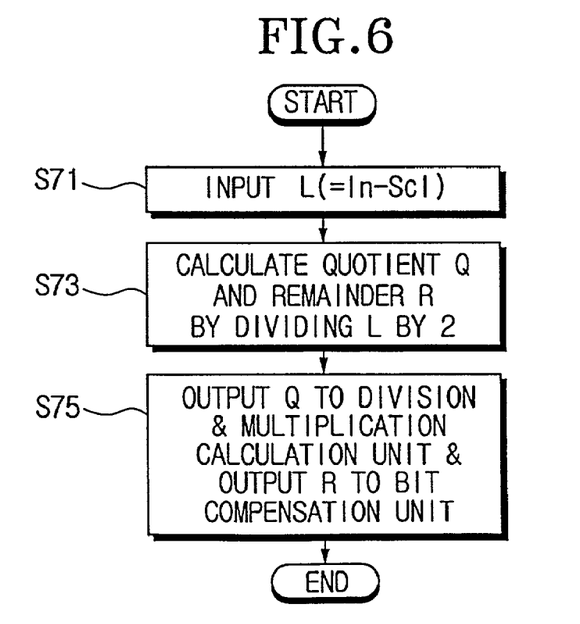
FIG. 6 is a flowchart for showing the steps of calculating a coefficient of the coefficient calculation unit of FIG. 4.

FIG. 6 is a flowchart for showing the steps of the coefficient calculation performed by the coefficient calculation unit 53 of FIG. 4. First, the coefficient calculation unit 53 receives both the difference value L, i.e., the difference between the bit value of the predetermined number of stages n and the bit value of the scale count Sc (step S71). Next, the coefficient calculation unit 53 calculates the quotient Q and the remainder R by dividing the difference value L by 2 (step S73). Then the quotient Q is outputted to the division and multiplication calculation unit 57, while the remainder R is outputted to the bit compensation unit 58 (step S75).

Figure 7:
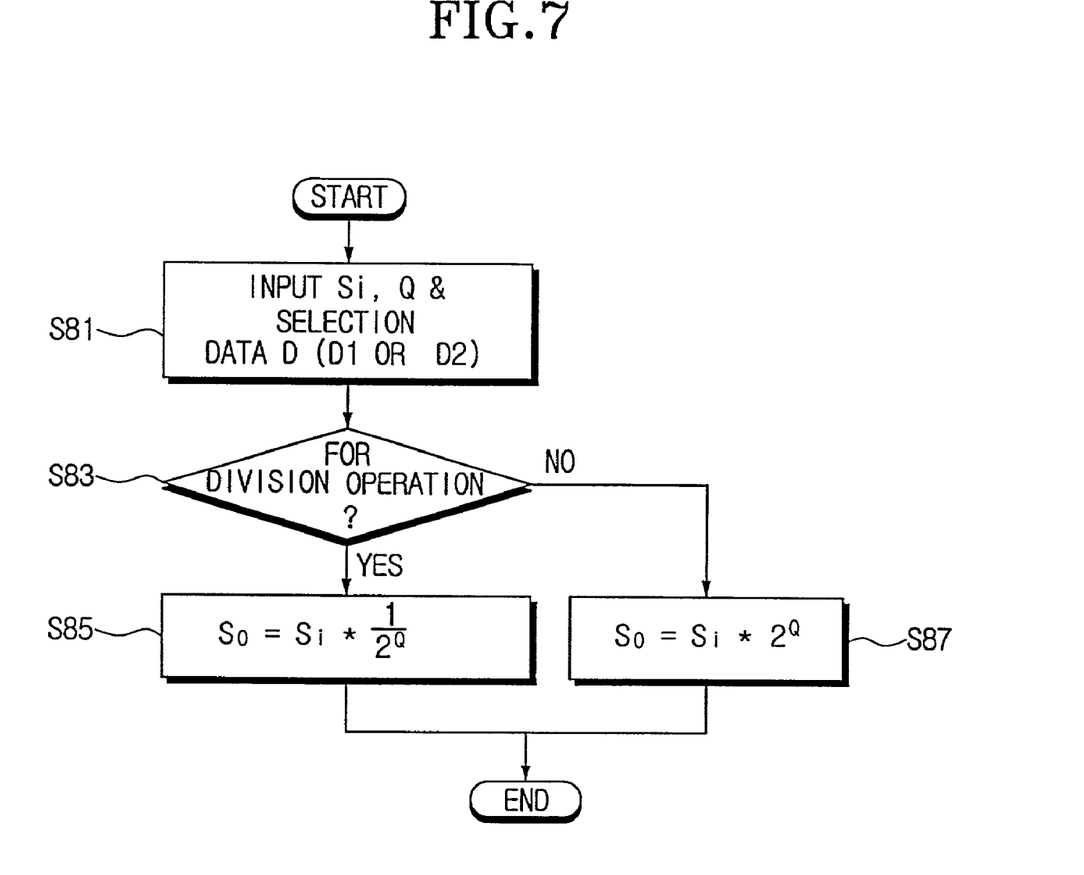
FIG. 7 is a flowchart for showing the steps of division or multiplication calculation of division and multiplication calculation unit of FIG. 4.

FIG. 7 is a flowchart for showing the steps of the division and multiplication performed by the division and multiplication calculation unit 57 of FIG. 4. First, the division and multiplication calculation unit 57 receives data Si (output from the second operation unit 55), the quotient Q (output from the coefficient calculation unit 53) and the selection signal D (output from the division and multiplication selection unit 51) (step S81). Next, the division and multiplication calculation unit 57 determines whether the selection signal D is for the division operation or for the multiplication operation based on the received data (step S83). If the selection signal D is for the division operation D1, the division and multiplication calculation unit 57 divides the data Si (output from the second operation unit 55) by $2^Q$, yielding a result value So (step S85). On the other hand, if the selection signal D is not for the division operation, the division and multiplication calculation unit 57 multiplies the data Si (output from the second operation unit 55) by $2^Q$, yielding a result value So (step S87).

Figure 8:
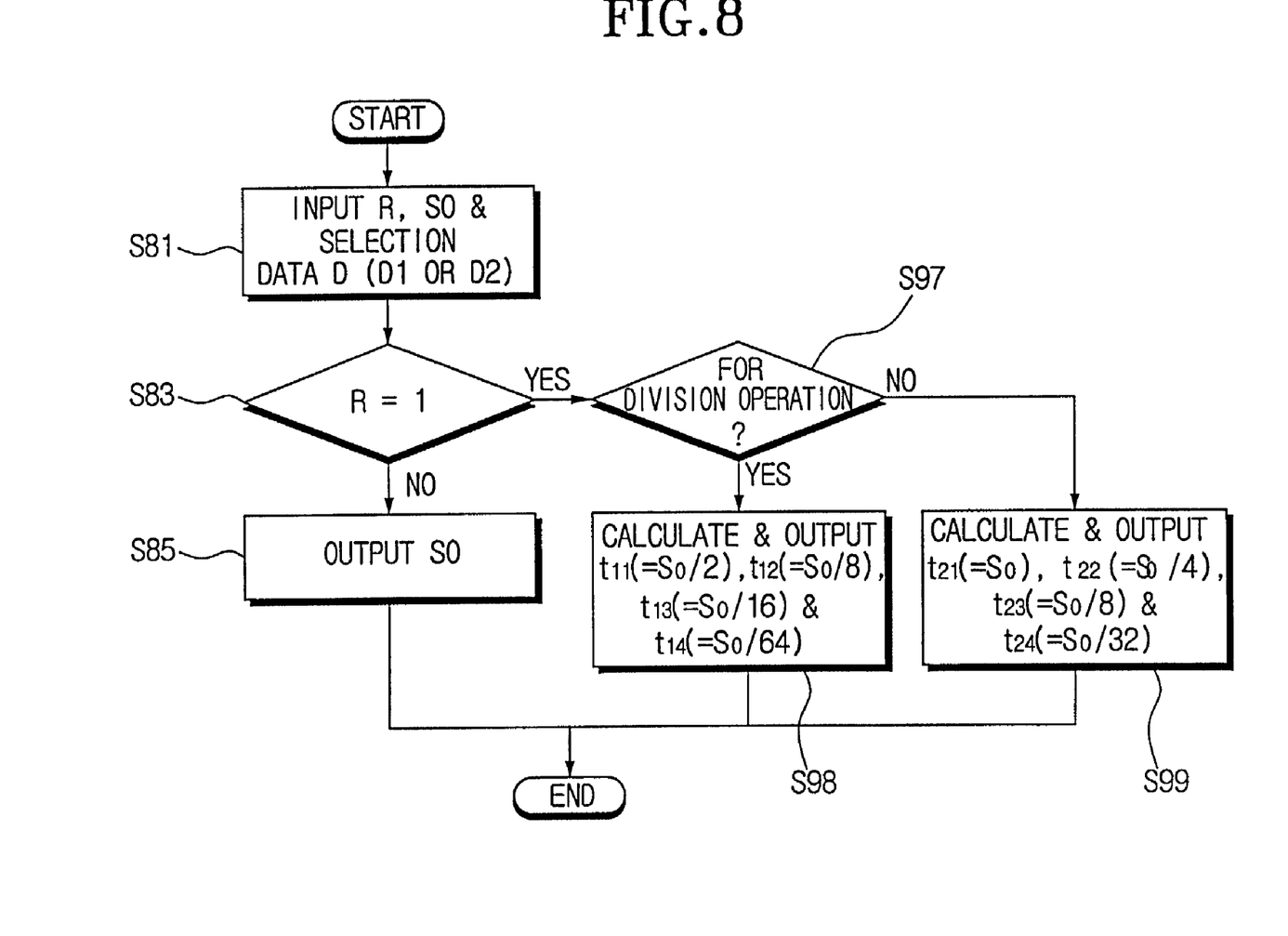
FIG. 8 is a flowchart for showing the steps of compensating for bit signal of bit compensation unit of FIG. 4.

FIG. 8 is a flowchart for showing the steps of the compensation of bit signal performed by the bit compensation unit 58. First, the bit compensation unit 58 receives the selection signal D (output from the division and multiplication selection unit 51), the remainder R (output from the coefficient calculation unit 53) and the bit signal So (output from the division and multiplication calculation unit 57) (step S81). Next, the bit compensation unit 58 determines whether the remainder R is "1" (step S83). If the remainder R is not "1", then the bit compensation unit 58 outputs the bit signal So output from the division and multiplication unit 57 intact (step S95).

When the remainder R is "1", then it is determined whether the selection signal D is for the division operation, D1, or the multiplication operation, D2 (step S97). If the selection signal D is set for the division operation D1, then the bit compensation unit 58 performs the multiplication operation on the bit signal So output from the division and multiplication calculation unit 57, outputting result values t11=So×½, t12=So×⅛, t13 =So×1/16, t14=So×1/64, respectively (step S98).

On the other hand, if the selection data D is for the multiplication operation D2, then the bit compensation unit 58 performs the multiplication operations on the bit signal So output from the division and multiplication calculation unit 57, outputting result values t21=So, t22=So×¼, t23=So ×⅛, t24=So×1/32, respectively (step S99).

Accordingly, although an input signal to the input buffer unit 33 is amplified through the butterfly operation unit 37, the resulting signal falls within the predetermined limit of the input signal to the input buffer unit 33 since the resulting signal is set according to the scale count Sc and the scale factor Sf for the butterfly operation.

According to the FFT apparatus of the present invention for compensating an OFDM output bit signal, the extent of the amplification of the received OFDM bit signal can be calculated by utilizing both the scale factor Sf, calculated by the butterfly operation and the scale count Sc, generated by the cumulative counting of the count figure corresponding to the scale factor.

Also, as the extent of increase and decrease of the received bit signal can be measured by controlling the scale value, it is also possible to control the restored value from the received bit signal so that it falls within the predetermined range of the input bit signal.

Since the butterfly operated scale factor Sf is measured at each stage, the flexible scale factor values and scale count values can be calculated at each stage, thus a bit signal for the received bit signal can be calculated more accurately.

In the drawings and specification, there has been disclosed a typical preferred embodiment of the invention and, although specific terms are employed, they are used in a generic and descriptive sense only and not for purposes of limitation, the scope of the invention being set forth in the following claims.

What is claimed is:

1. Fast Fourier Transforming apparatus for compensating an OFDM output bit signal, comprising:

an input buffer unit for storing and outputting a received OFDM bit signal;

a butterfly operation unit for performing a butterfly operation according to a radix algorithm at each stage;

a scale detection unit for calculating and outputting a scale factor which is a division factor used for controlling a bit value of a butterfly operated signal input from the butterfly operation unit to the input buffer unit at each stage within a predetermined bit limit of the received OFDM signal, a scale count unit for cumulative counting a count coefficient corresponding to the scale factor input from the scale detection unit, and then outputting a first result, and a compensation unit for controlling the bit of a signal input from the butterfly operation unit according to values obtained from the scale detection and the scale count unit, and then outputting a second result.

2. The Fast Fourier Transforming apparatus of claim 1, further comprising a first operation unit for dividing a bit value of a later input signal by the scale factor and outputting a third result, thereby considering the scale factor from the scale detection unit when performing the butterfly operation.

3. The Fast Fourier Transforming apparatus of claim 1, further comprising an output buffer unit for storing a signal output from the butterfly operation unit at each of the stages and a control unit for controlling the signal stored in the output buffer unit to feed back to the input buffer unit until the butterfly operation is conducted as many times as the predetermined number of stages and outputting a butterfly operated signal at a final stage of the predetermined stages to the bit-compensating unit.

4. The Fast Fourier Transforming apparatus of claim 3, wherein a radix-2 algorithm is applied to the butterfly operation unit, the control unit controls the OFDM bit signal to be input to the input buffer unit by units of 8 bits and controls the predetermined bit limit of the scale detection unit to beset to 12 bits.

5. The Fast Fourier Transforming apparatus of claim 4, wherein the scale factor is to be set to 4 if an absolute value of the butterfly operated bit signal is more than 1024, to 2 if 512 and to 1 if 256 so that the butterfly operated bit value can be maintained at 8 bits.

6. The Fast Fourier Transforming apparatus of claim 5, wherein the scale count unit applies 2 as the count figures if the scale factor from the scale detection unit is 4,1 if 2 and 0 if 1 for cumulative counting the count figures corresponding to the scale factor.

7. The Fast Fourier Transforming apparatus of claim 1, wherein the compensation unit compensates for the bit value of the input signal of the input buffer unit by the difference of the bit value of the predetermined number of stages and the input signal to the scale count unit.

8. The Fast Fourier Transforming apparatus of claim 7, wherein the compensation unit comprises, a second operation unit for dividing the bit value of the butterfly operated output signal at the final stage of the predetermined stages by the scale factor calculated at the final stage, a division and multiplication selection unit for calculating a difference value of the predetermined number of stages and an output value from the scale count unit, comparing the predetermined number of stages with the output value from the scale count unit and outputting a selection data for division operation if the predetermined number of stages is greater or a selection signal for multiplication if the output value from the scale count unit is greater, a coefficient calculation unit for calculating and outputting a quotient Q and a remainder R by dividing the difference value by 2, a division and multiplication calculation unit for dividing the value output from the second operation unit by $2^Q$ if the selection data is for the division operation while for multiplying the value output from the second operation unit by $2^Q$ if the selection data is for the multiplication operation, a bit compensation unit for compensating the value output from the division and multiplication calculation unit according to the selection data from the division and multiplication selection unit and the remainder R from the coefficient calculation unit, and an adder unit for adding the data input from the bit compensation unit and outputting the second result.

9. The Fast Fourier Transforming apparatus of claim 8, wherein the bit compensation unit outputs the data input from the division and multiplication calculation unit intact if the remainder R is not 1, where the remainder is calculated from the division of the difference value between the scale count value and the predetermined number of stages by 2.

10. The Fast Fourier Transforming apparatus of claim 8, wherein the bit compensation unit multiplies the data input from the division and multiplication calculation unit by ½, ⅛, ⅟₁₆, ⅟₆₄, respectively, if the remainder R is 1 and the selection data is for the division operation, thereby outputting each of the result value to the adder unit.

11. The Fast Fourier Transforming apparatus of claim 8, wherein the bit compensation unit multiplies the data input from the division and multiplication calculation unit by 1, ¼, ⅛, ⅟₃₂, respectively, if the remainder R is 1 and the selection data is for the multiplication operation, thereby outputting each of the result value to the adder unit.

12. The Fast Fourier Transforming apparatus of claim 8, wherein the adder unit adds each of 4 result values from the bit compensation unit to compensate for the bit of the input signal.

13. A Fast Fourier Transforming method for compensating an OFDM output bit signal, comprising:

a step of input buffering for storing and outputting a received OFDM bit signal, a step of first operation for dividing the received signal by a scale factor and outputting a first result, a step of butterfly operation for butterfly operating on the first result at each of the stages according to a radix algorithm and outputting a butterfly operated signal, a step of scale detection for calculating the scale factor which is a division factor and is used for controlling the bit value of the butterfly operated signal to fall within the predetermined bit limit of the OFDM signal input at the step of the input buffering, a step of scale counting for cumulatively counting a count figure corresponding to the scale factor of the input bit signal and outputting a cumulative scale count value, a step of feed back for repeating the step of input buffering through the step of scale count until a predetermined number of stages is reached, and a step of compensation for controlling a butterfly operated value, which is calculated at the final stage of a predetermined number of stages, according to the scale factor and the scale count value.

14. The Fast Fourier Transforming method of claim 13, further comprising a step of dividing a bit value of a later input signal by the scale factor and outputting the divided result, thereby performing the butterfly operation in a manner of considering the scale factor.

15. The Fast Fourier Transforming method of claim 13, further comprising a step of output buffering for storing a signal resulting from the step of butterfly operation at each of the stages; and a step of input/output control for controlling the signal stored at the step of output buffering to feed back to the step of input buffering until the butterfly operation is conducted as many times as the predetermined number of stages and passing the butterfly operated signal at the final stage of predetermined number of stages to the step of compensation.

16. The Fast Fourier Transforming method of claim 15, wherein, if a radix-2 algorithm is applied to the step of butterfly operation, the step of input/output control controls the OFDM bit signal to be passed to the step of input buffering by a unit of 8 bits and controls a predetermined bit limit to be set to 12 bits at the step of scale detection.

17. The Fast Fourier Transforming method of claim 16, wherein the scale factor is set to 4 if an absolute value of the butterfly operated bit signal is greater than 1024, to 2 if 412 and to 1 if 256, so that the butterfly operated bit value can be maintained at 8 bits.

18. The Fast Fourier Transforming method of claim 17, wherein at the step of scale counting, the number 4 is applied as the count factor if the scale factor is 4, 2 if 2 and 1 if 1 for cumulative counting the count figure corresponding to the scale factor.

19. The Fast Fourier Transforming method of claim 13, wherein at the step of compensation, the bit value of the input signal of the step of input buffering is compensated by a difference of the bit value of the predetermined number of stages and the signal input from the step of scale count.

20. The Fast Fourier Transforming method of claim 19, wherein the step of compensation comprises:

a step of a second operation for dividing the bit value of the butterfly operated output signal at the final stage of the predetermined number of stages by the scale factor calculated at the final stage;

a step of division and multiplication selection for calculating a difference value of the predetermined number of stages and the scale count value, comparing the predetermined number of stages with the scale count value and outputting a selection data for division operation if the predetermined number of stages is greater, while outputting a selection data for multiplication if the scale count value is greater;

a step of factor calculation for calculating and outputting a quotient Q and a remainder R by dividing the difference value by 2;

a step of division and multiplication calculation for dividing the value resulting from the step of second operation by $2^Q$ if the selection data is for the division operation, while multiplying the value resulted from the step of second operation by $2^Q$ if the selection data is for the multiplication operation;

a step of bit compensation for compensating for the bit value resulting from the step of division and multiplication calculation according to the selection data and the remainder R; and a step of adding for adding the bit data compensated at the step of bit compensation and outputting a second result.

21. The Fast Fourier Transforming method of claim 20, wherein at the step of bit compensation, the data resulting from the step of division and multiplication calculation is output intact, if the remainder R is not 1.

22. The Fast Fourier Transforming method of claim 20, wherein at the step of bit compensation, the data resulting from the step of division and multiplication calculation is multiplied by ½, ⅛, ¹/₁₆, ¹/₆₄, respectively, if the remainder R is 1 and the selection data is for the division operation, thereby passing each of the result values to the step of adding.

23. Fast Fourier Transforming method of claim 20, wherein at the step of bit compensation, the data resulting from the step of division and multiplication calculation is multiplied by ½, ¼, ⅛, ¹/₃₂, respectively, if the remainder R is 1 and the selection data is for the multiplication operation, thereby passing each of the result values to the step of adding.

24. The fast Fourier transforming method of claim 20, wherein at the step of adding, each of 4 result values from the step of bit compensation is added, thereby compensating for the bit of the input signal.

\* \* \* \* \*